United States Patent
Hoang

(10) Patent No.: US 9,474,128 B2
(45) Date of Patent: Oct. 18, 2016

(54) LIGHTING DEVICE WITH AMBIENT LIGHT SENSOR

(71) Applicant: Phase Final, Inc., Irvine, CA (US)

(72) Inventor: Vuong Hoang, Irvine, CA (US)

(73) Assignee: Phase Final, Inc., Irvine, CA (US)

( * ) Notice: Subject to any disclaimer, the term of this patent is extended or adjusted under 35 U.S.C. 154(b) by 69 days.

(21) Appl. No.: 14/461,256

(22) Filed: Aug. 15, 2014

(65) Prior Publication Data

US 2016/0050736 A1     Feb. 18, 2016

(51) Int. Cl.
| | |
|---|---|
| H05B 37/02 | (2006.01) |
| F21L 4/00 | (2006.01) |
| F21V 23/04 | (2006.01) |
| F21Y 101/02 | (2006.01) |

(52) U.S. Cl.
CPC .......... *H05B 37/0218* (2013.01); *F21L 4/005* (2013.01); *F21V 23/0464* (2013.01); *F21Y 2101/02* (2013.01)

(58) Field of Classification Search
CPC ... H05B 37/02; H05B 37/0218; F21L 4/005; F21V 23/0442; F21V 23/0464; F21Y 2101/02
USPC ............. 315/209 R, 224–226, 291, 307, 308
See application file for complete search history.

(56) References Cited

U.S. PATENT DOCUMENTS

| | | | |
|---|---|---|---|
| 7,410,271 B1 | 8/2008 | Man | |
| 8,378,587 B2 | 2/2013 | Huguenin et al. | |
| 8,466,907 B2* | 6/2013 | Bell | G09G 3/20 345/102 |
| 8,643,305 B2* | 2/2014 | Lebens | F21L 4/027 315/291 |
| 2005/0099798 A1 | 5/2005 | Cugini et al. | |
| 2014/0001955 A1 | 1/2014 | Bouffay et al. | |
| 2014/0009066 A1 | 1/2014 | Bouffay et al. | |
| 2014/0070700 A1 | 3/2014 | Genthon et al. | |

FOREIGN PATENT DOCUMENTS

WO    WO 2008/070977    6/2008

OTHER PUBLICATIONS

Petzl, Press release 2012, www.vandernet.com/tuotekuvat/E36%20A/tiedostot/Petzl_Nao_Press_Release_2012_EN.pdf, 2012, 1 page.

(Continued)

*Primary Examiner* — Jimmy Vu
(74) *Attorney, Agent, or Firm* — Archer Norris, PLC; Sean D. Senn; Priti D. Phukan

(57) ABSTRACT

A lighting device may be implemented to automatically adjust a projected light level based on ambient lighting conditions detected at a sensor. In one example, a lighting device includes a light source adapted to project light. The lighting device also includes a sensor adapted to provide illumination measurements based on ambient light detected by the sensor including at least a reflected portion of the projected light. The lighting device also includes a controller adapted to select a range of illumination levels and adjust the projected light based on the provided illumination measurements to transition the projected light through a plurality of projected light levels until at least a new illumination measurement provided by the sensor is within the range of illumination levels. Additional devices and related methods are also provided.

20 Claims, 14 Drawing Sheets

(56) References Cited

OTHER PUBLICATIONS

PID Controller-Wikipedia, http://en.wikipedia.org/wiki/PID_controller, Aug. 11, 2014, 17 pages.

"Petzl Nao headlamp—technical notice", Petzl, Feb. 5, 2013, pp. 1-4, [online], [retrieved on Oct. 20, 2015]. Retrieved from the Internet: <URL:http://web.archive,org/web/20130205011500/http://www.petzl.com/files/all/technical-notice/headlamps/E36_NAO.pdf >.

* cited by examiner

LIGHTING DEVICE WITH AMBIENT LIGHT SENSOR

BACKGROUND

1. Field of the Invention

The present invention generally relates to lighting devices and, more particularly, to lighting devices with ambient light sensors.

2. Related Art

Lighting devices, such as flashlights, headlamps, and others, typically include various mechanical and/or electrical structures used to illuminate areas of interest. A user may wish to adjust the output level of light produced by such devices in many environments.

For example, in certain tactical situations, the user may wish to adjust light output levels to provide an appropriately low or high light level depending on changing conditions. As another example, when wearing a night-vision device, the user may be acutely sensitive to changes in lighting conditions. As such, quick adjustments to light output levels of the lighting device are important for the user to see clearly without being blinded by oversaturated lighting conditions.

Although some conventional lighting devices may permit the user to adjust light output levels, existing implementations are often inconvenient or impractical, especially in changing environments (e.g., if lighting conditions change frequently). For example, some tactical situations may preclude the user from having sufficient time, focus, or dexterity to manually adjust light output levels.

SUMMARY

Various techniques are provided to control light levels projected by a light source of a lighting device. For example, the lighting device may include a sensor and a controller configured to adjust the projected light based on illumination measurements provided by the sensor. The controller may adjust the projected light through a plurality of levels (e.g., by transitioning the projected light through a plurality of intermediate projected light levels) until a desired range of illumination levels is reached, such as when ambient light detected by the sensor corresponds to an illumination level in the desired range. In some embodiments, the controller may operate in an iterative fashion to adjust the projected light in response to changing ambient lighting conditions detected by the sensor. Such changing conditions may include, for example, changes in the overall illumination level in an operating environment of the lighting device, introduction or removal of various particular light sources into the operating environment (e.g., other lighting devices shining on a target area), and/or other factors.

In one embodiment, a lighting device includes a light source adapted to project light; a sensor adapted to provide illumination measurements based on ambient light detected by the sensor including at least a reflected portion of the projected light; and a controller adapted to: select a range of illumination levels, and adjust the projected light based on the provided illumination measurements to transition the projected light through a plurality of projected light levels until at least a new illumination measurement provided by the sensor is within the range of illumination levels.

In another embodiment, a method of operating a lighting device includes selecting a range of illumination levels; projecting light from a light source of the lighting device; providing, by a sensor of the lighting device, illumination measurements based on ambient light detected by the sensor including at least a reflected portion of the projected light; and adjusting the projected light based on the provided illumination measurements to transition the projected light through a plurality of projected light levels until at least a new illumination measurement provided by the sensor is within the range of illumination levels.

The scope of the invention is defined by the claims, which are incorporated into this section by reference. A more complete understanding of embodiments of the present disclosure will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE FIGURES

Embodiments of the present disclosure and their advantages are best understood by referring to the detailed description that follows. It should be appreciated that like reference numerals are used to identify like elements illustrated in one or more of the figures.

DETAILED DESCRIPTION

Figure 1A:
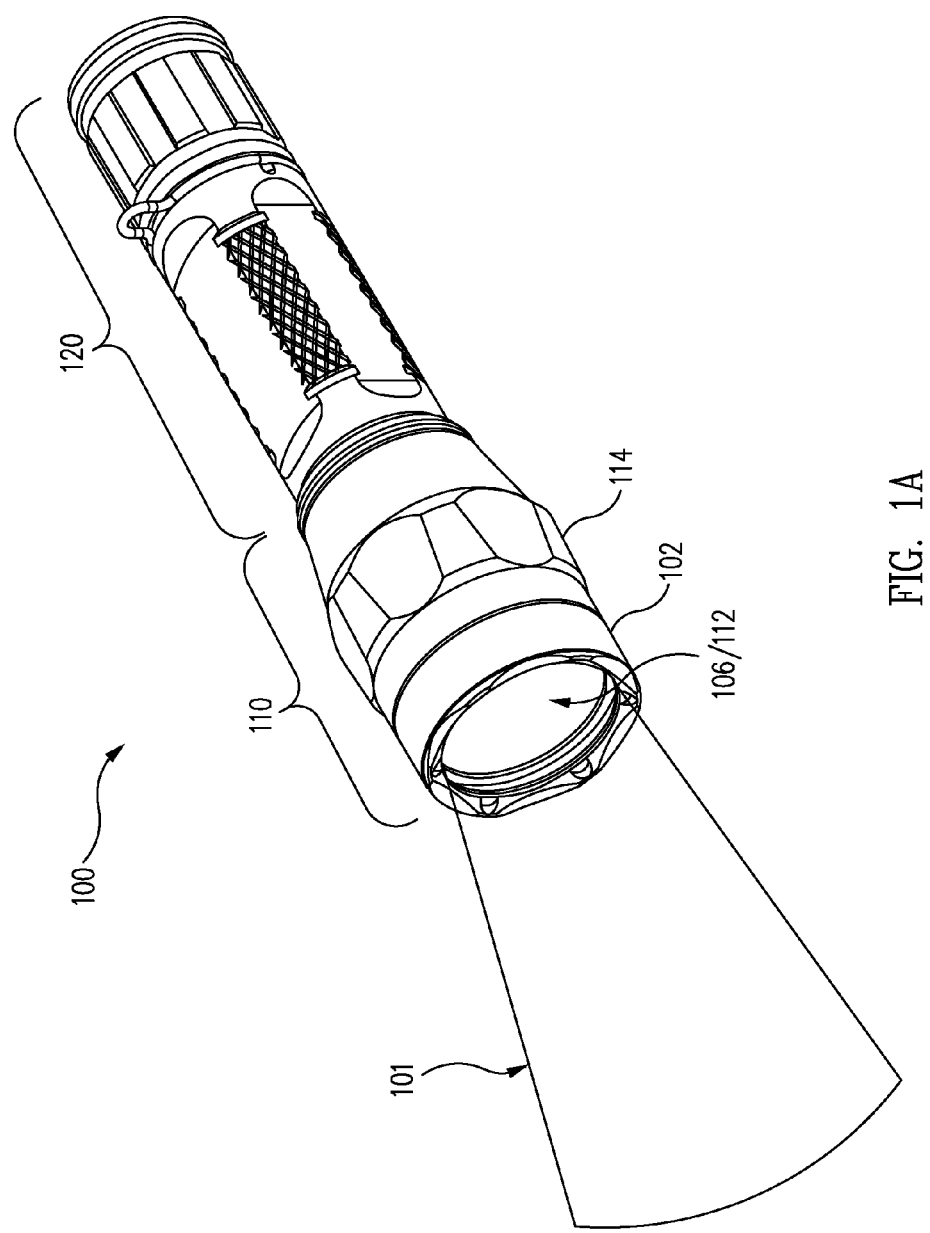
FIG. 1A illustrates a perspective view of a lighting device in accordance with an embodiment of the disclosure.

In accordance with various embodiments provided herein, a lighting device may be implemented to automatically adjust a projected light level based on ambient light detected at a sensor. For example, in some embodiments, such a lighting device may include a controller configured to determine whether illumination measurements provided by the sensor are within a desired range of illumination levels. If the illumination measurements are not within the desired range of illumination levels, the controller may adjust the projected light level of the lighting device through a plurality of intermediate projected light levels at a selected rate until the desired range of illumination levels is reached. The detection and the adjustment processes may form a closed feedback loop to repeatedly detect the ambient light and adjust the projected light level of the lighting device.

In some embodiments, the controller may determine a direction and a rate of adjustment based on a difference between the illumination measurements provided by the sensor and the desired range of illumination levels. For example, the rate of adjustment for decreasing the projected light level may be greater than the rate of adjustment for increasing the projected light level. As such, the lighting device may dim quickly (e.g., to rapidly reduce unwanted glare from reflected portions of the projected light when the detected ambient light is too high) and may brighten (e.g., light up) slowly (e.g., to permit a user's eyes to adjust to the brighter light). In another example, the rate of adjustment may be greater when the difference between the illumination measurements and the desired range of illumination levels is greater and the rate of adjustment may be less when the difference between the illumination measurements and the desired range of illumination levels is less. As such, the projected light level may change quickly when the illumination measurements are far away from the desired range and the change may slow down when the illumination measurements approach the desired range.

Referring now to the drawings wherein the showings are for purposes of illustrating embodiments of the present disclosure only, and not for purposes of limiting the same, FIGS. 1A-D provide various views of a lighting device 100 in accordance with embodiments of the disclosure. As shown, lighting device 100 may be a flashlight including a head 110 and a body 120. Head 110 may include various components for producing and controlling light 101 (e.g., a light beam) directed toward an area of interest. Body 120 may include various components for providing power to produce the projected light.

Head 110 may include a bezel 102, a gasket 104, a planar lens 106, and an O-ring 108. The gasket 104 and the O-ring 108 may sandwich the planar lens 106 to provide cushioning to the planar lens 106. As such, the planar lens 106 may be protected from vibrations or breakage. The gasket 104 and the O-ring 108 also may operate as a seal to protect the internal components of the lighting device 100 from external elements, such as dust or moisture. The head 110 may also include a head casing 114 (e.g., a housing) with a threaded portion 116 at a distal end thereof. The threaded portion 116 of the head casing 114 may receive the bezel 102. For example, the bezel 102 may include internal threads and may be screwed onto the threaded portion 116 of the head casing 114.

The head 110 may also include an optical element 112 to receive light projected from a light source 126 and shape the light into a desired beam shape (e.g., having a desired direction and/or beam spread). In some embodiments, optical element 112 may be implemented as an optical reflector, such as a mirror or a lens with light reflecting properties. In some embodiments, optical element 112 may be implemented as a total internal reflection (TIR) lens (e.g., as illustrated in FIG. 1D).

Light source 126 may be implemented, for example, as a light emitting diode (LED), an incandescent light bulb, a tungsten-halogen light bulb, a fluorescent light bulb, a high-intensity discharge light bulb, or any other singular or plural light source devices.

The planar lens 106 may be supported between the optical element 112 and the bezel 102 when the bezel 102 is attached to the head casing 114. The gasket 104 may be disposed between bezel 102 and the planar lens 106. The O-ring 108 may be disposed between the planar lens 106 and the optical element 112. In one embodiment, planar lens 106 may be a substantially flat (e.g., plano-plano) lens. It is contemplated that planar lens 106 may be implemented in accordance with any desired type of lens in other embodiments.

A printed circuit board (PCB) 124 may also be provided in the head casing 114. The PCB 124 may include light source 126. The PCB 124 may be disposed between the optical element 112 and the body 120. In some embodiments, the optical element 112 may include a center aperture and the light source 126 may be disposed at the center aperture to project light therethrough. In some embodiments, optical element 112 may be implemented as a solid optical element that directs light from the light source 126 toward planar lens 106 (e.g., using reflection, total internal reflections, or other techniques as appropriate). Planar lens 106 and optical element 112 may be formed of glass, plastic, or any other desired material. Indeed, any desired combination of material and types of lenses or reflectors may be used.

A sensor 118 (e.g., an optical sensor) may be provided and connected to the PCB 124. In some embodiments, a filter 122 may be disposed at a distal end of the sensor 118. The filter 122 may substantially filter out one or more wavebands, such as ultraviolet, infrared, and/or other non-visible light. As such, visible light may be provided to the sensor 118.

The sensor 118 may detect light (e.g., optionally filtered by filter 122) and provide signals (e.g., voltages and/or currents) in response thereto. For example, in some embodiments, such signals may correspond to illumination measurements based on the intensity (e.g., luminous flux in the case of visible light filtered by filter 122, or radiant flux in the case of unfiltered light) of ambient light detected by the sensor 118. Such intensity is also referred to herein as an illumination level. In some embodiments, the sensor 118 may mimic the sensitivity of a human eye. Although a single forward-facing sensor 118 is described herein, one or more additional sensors may be used to provide illumination measurements to a controller as described herein, and such sensors may face in any desired directions to detect light (e.g., forward, backward, sideways, up, down, and/or any desired angle).

An aperture 128 may be formed, for example, in a side wall of the optical element 112. The sensor 118 may be disposed through the aperture 128. In particular, the sensor 118 and the filter 122 may be disposed to face toward the planar lens 106 to receive ambient light through the planar lens 106 as shown in the front view of FIG. 1C. For example, the sensor 118 and the filter 122 may face away from the light source 126, such that the sensor 118 does not detect light produced directly from the light source 126. In this regard, the sensor 118 may detect ambient light including, for example, light from various sources in the operating environment of lighting device 100 and/or reflected portions of the light projected by light source 126 (e.g., reflected by an external surface such as a wall, object, person, or other surface in the operating environment).

The PCB 124 may include a controller 302 (see FIG. 3) configured to control the level of light projected by the light source 126. For example, in some embodiments, controller 302 may adjust the projected light in accordance with a proportional-integral-derivative (PID) process. Controller 302 may receive the illumination measurements from the sensor 118 and adjust the projected light provided by the light source 126 in response thereto.

One or more power sources 306 (see FIG. 3) may be provided in the body 120 of the lighting device 100 and connected electrically to the PCB 124 to provide power to various components of lighting device 100. In various embodiments, power source 306 may be implemented, for example, by one or more batteries (e.g., rechargeable or non-rechargeable), solar cells, external power outlets, and/or other appropriate sources.

The controller 302 may control (e.g., adjust) the projected light level of the light source 126 by adjusting the amount of power, e.g., voltage and/or current, supplied to the light source 126. The controller 302 may repeatedly receive illumination measurements from sensor 118 and may adjust the projected light level of the light source 126 accordingly.

Figure 1B:
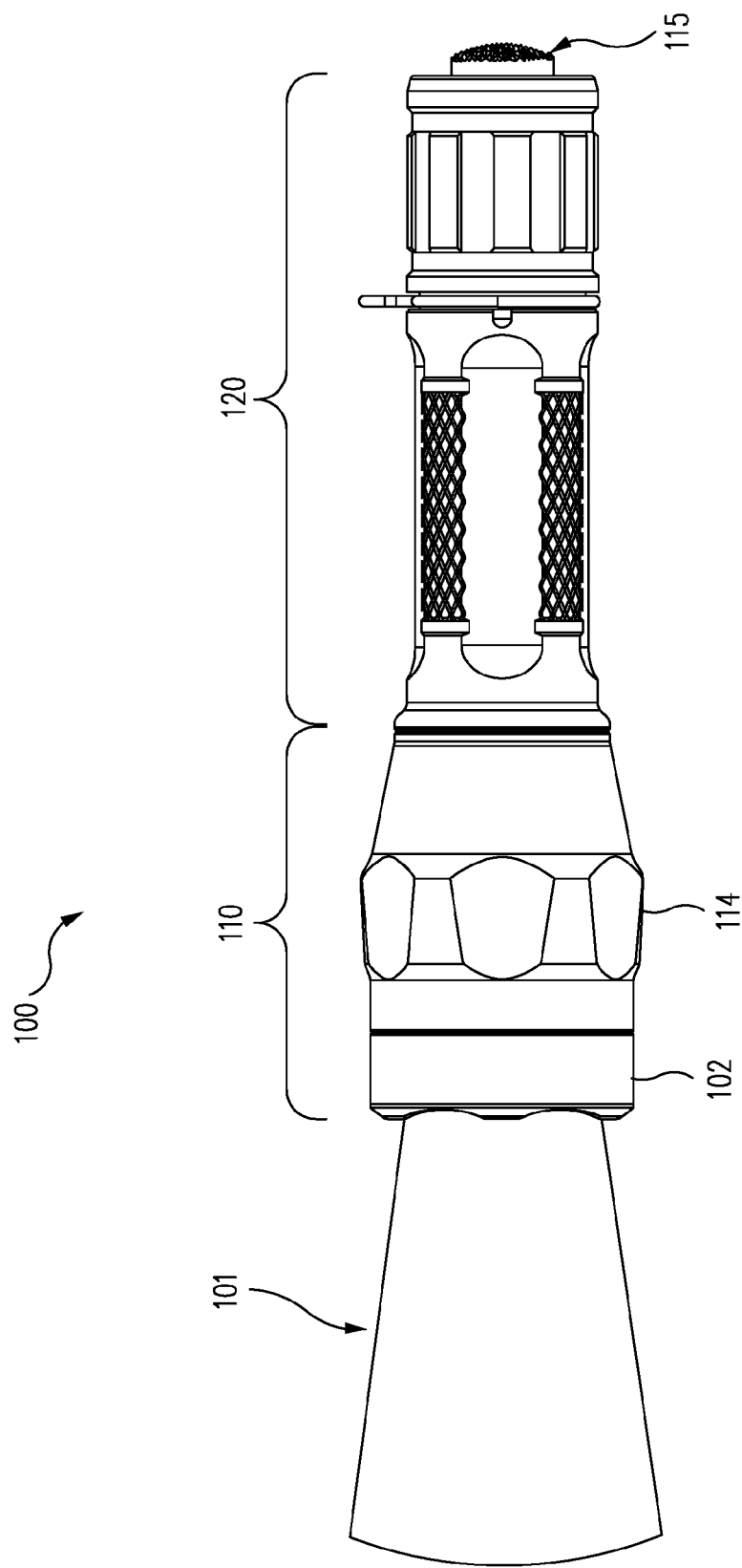
FIG. 1B illustrates a side view of the lighting device of FIG. 1A in accordance with an embodiment of the disclosure.
Figure 1C:
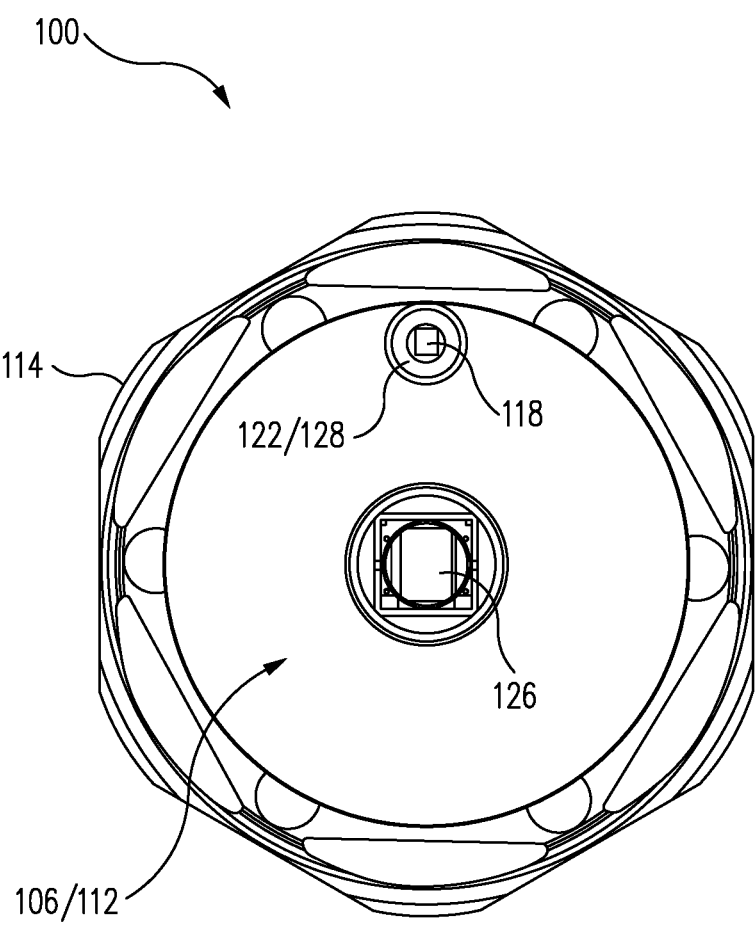
FIG. 1C illustrates a front view of the lighting device of FIG. 1A in accordance with an embodiment of the disclosure.
Figure 1D:
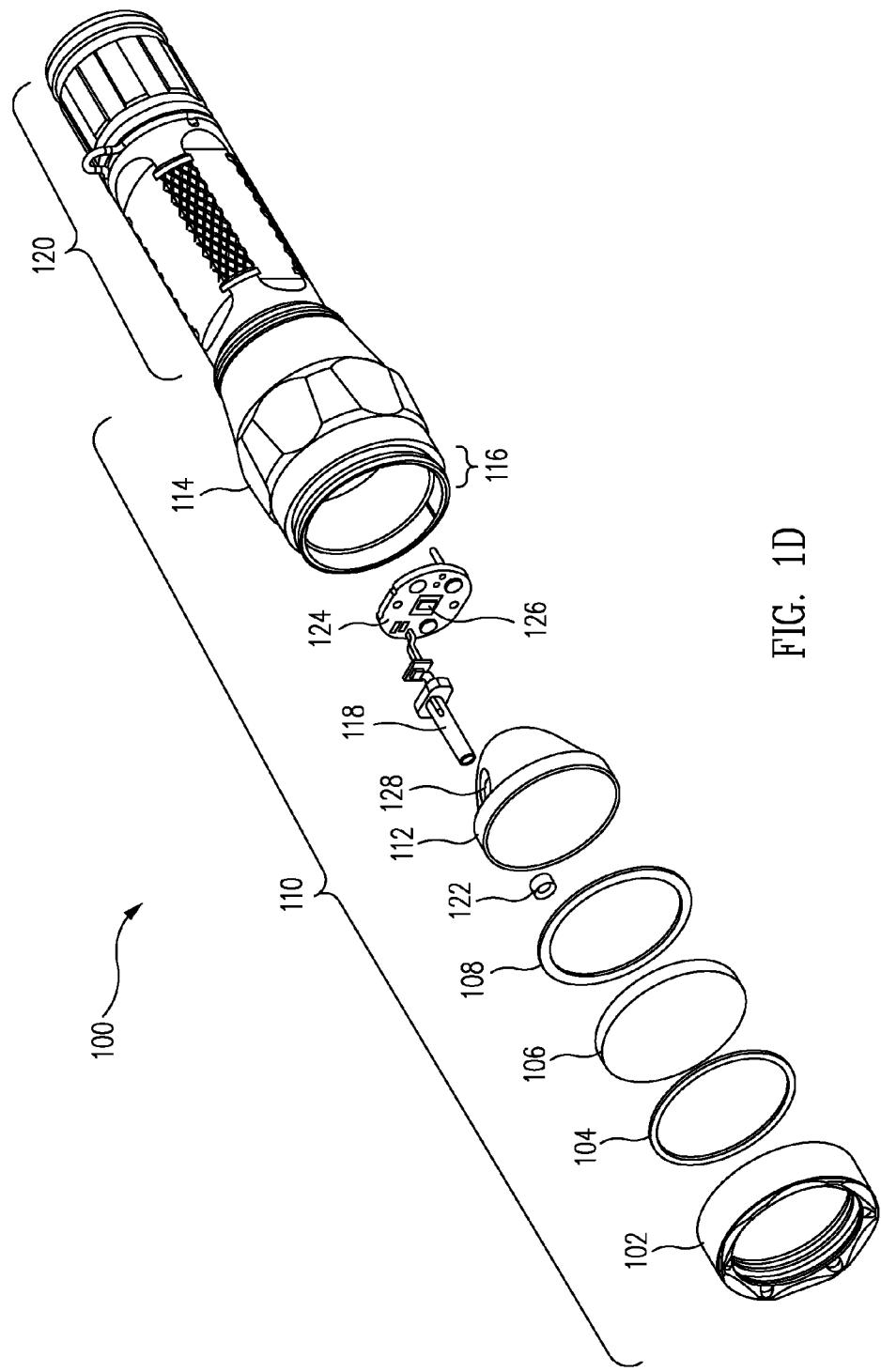
FIG. 1D illustrates an exploded perspective view of the lighting device of FIG. 1A in accordance with an embodiment of the disclosure.

As shown in FIG. 1B, one or more user controls 115 may be provided. User control 115 may be connected to PCB 124 (see FIG. 3) to provide signals to controller 302 and/or other components to adjust the operation of lighting device 100. User control 115 may be implemented as any desired type of control such as, for example, one or more tailcap switches (e.g., a multi-stage tailcap switch as illustrated in FIG. 1B), rotary selector rings, push button switches, and/or other controls.

FIGS. 2A-D provide various views of another lighting device 200 in accordance with embodiments of the disclosure. Lighting device 200 may include a head 210. Similar to head 110 of lighting device 100, head 210 may include various components for producing and controlling light 101 directed toward an area of interest. In various embodiments, head 210 may be configured to be coupled to any desired type of body 220 (e.g., illustrated in broken lines). In various embodiments, lighting device 200 may be carried manually by a user or attached to a wearable accessory of the user (e.g., a helmet, a headband, or other accessory), a weapon, and/or other devices.

Head 210 may include a bezel 202, an O-ring 204, a planar lens 206, a gasket 208, a front casing 214 having a threaded portion 216, a sensor 118, a PCB 124, and a light source 126, all of which may be implemented in the same or similar manner as corresponding components of lighting device 100.

Head 210 also includes a ring sleeve 221, a filter 222, and an optical element 212. Ring sleeve 221 may hold filter 222 and optical element 212 in position relative to front casing 214. Filter 222 may operate in the same or similar manner as filter 122 previously described. Optical element 212 may be implemented in the same or similar manner as optical element 112 previously described. Optical element 212 includes an aperture 228 configured to receive sensor 118 therethrough. As a result, sensor 118 may be positioned within head 210 and configured to receive light through planar lens 206 and filter 222 (see FIG. 2C).

Head 210 also includes a power interface assembly 232 that connects to PCB 124 and receives power, for example, from batteries disposed in body 220.

Head 210 also includes a rear casing 230 that is received by a rear threaded portion 217 of front casing 214. For example, the rear casing 230 may include internal threads and may be screwed onto a rear threaded portion 217 of the front casing 214. The rear casing 230 may cover and enclose a rear end of the front casing 214. The rear casing 230 may include an electrical contact 234 configured to connect electrically to power elements (not shown), such as batteries, to provide power to the head 210.

Figure 2A:
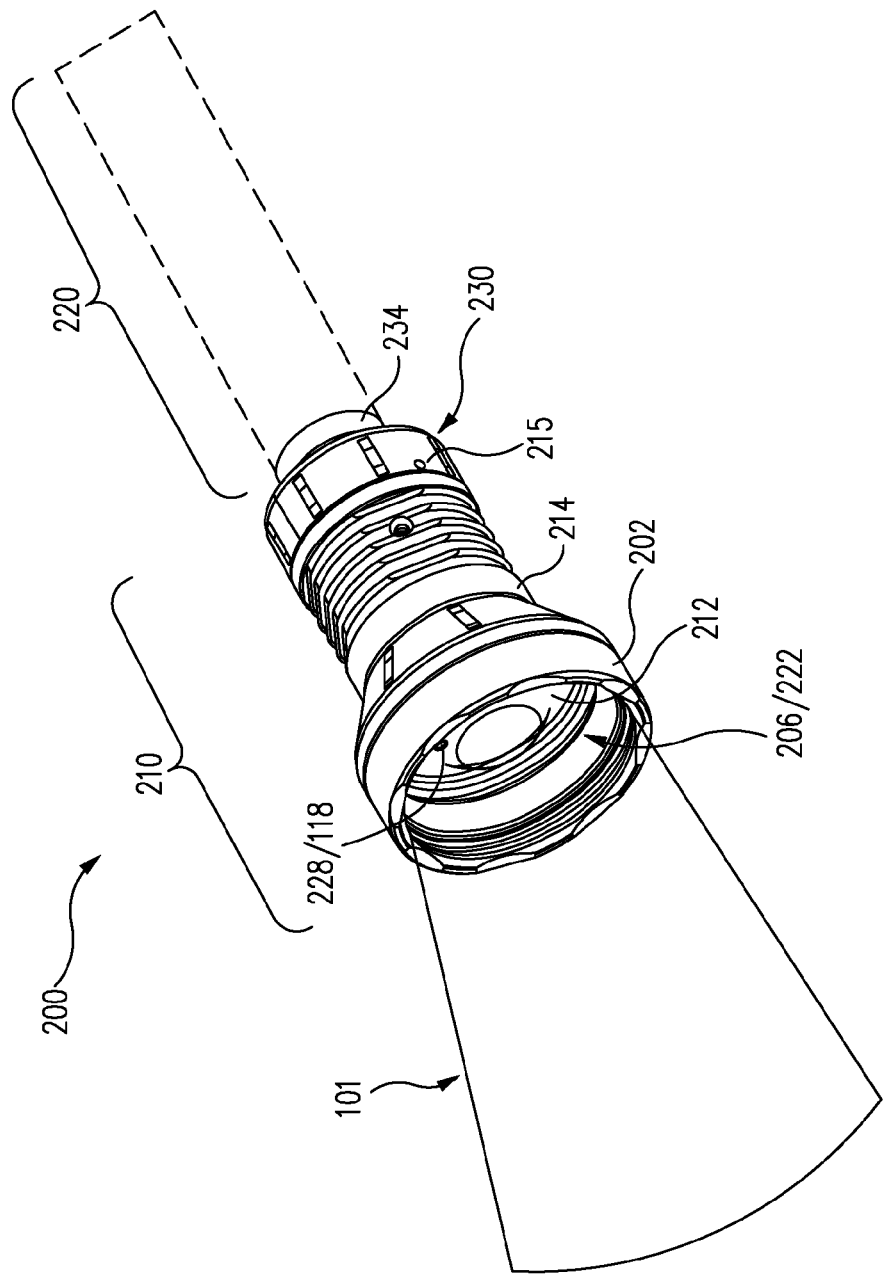
FIG. 2A illustrates a perspective view of another lighting device in accordance with an embodiment of the disclosure.
Figure 2B:
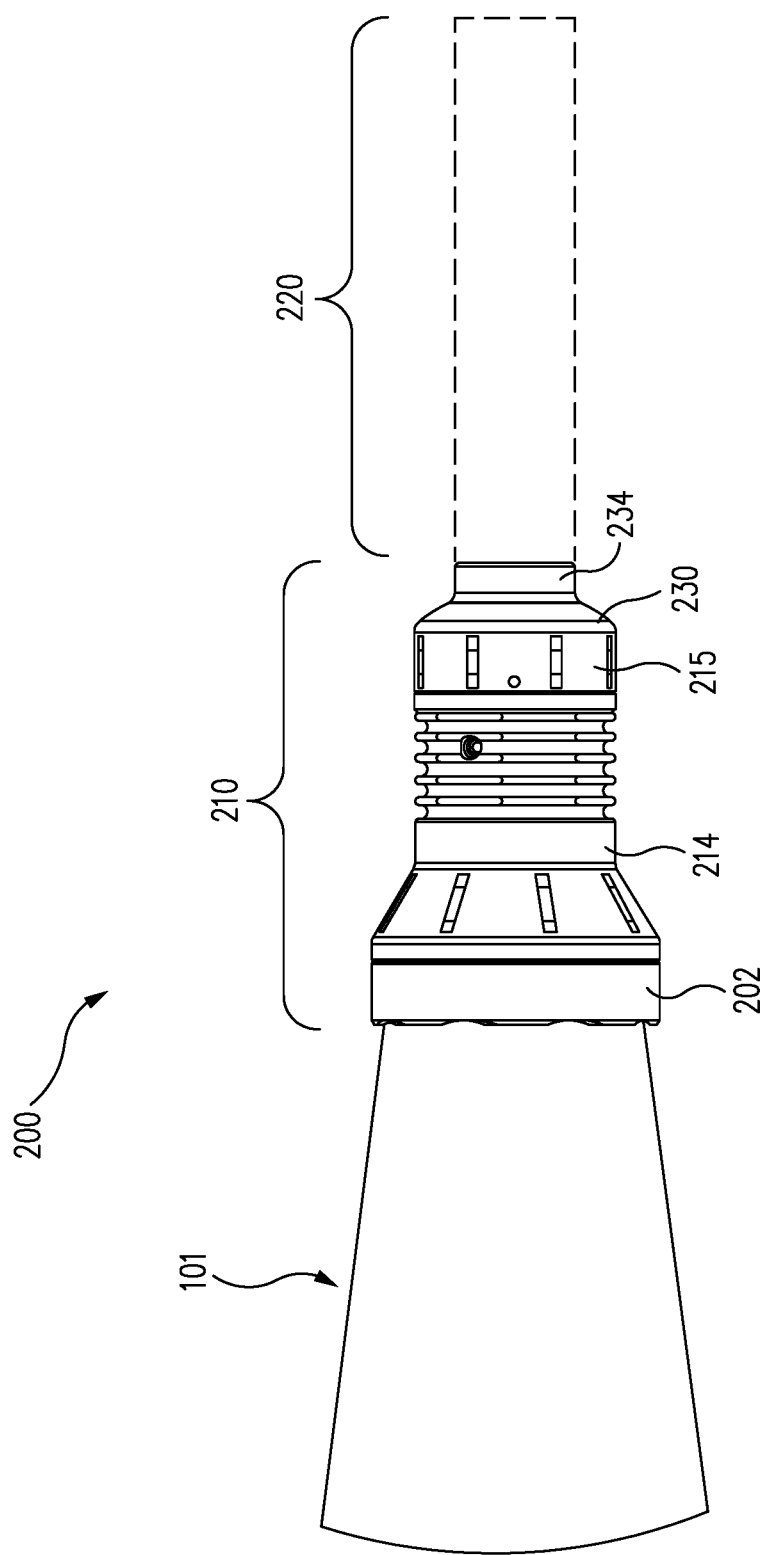
FIG. 2B illustrates a side view of the lighting device of FIG. 2A in accordance with an embodiment of the disclosure.
Figure 2C:
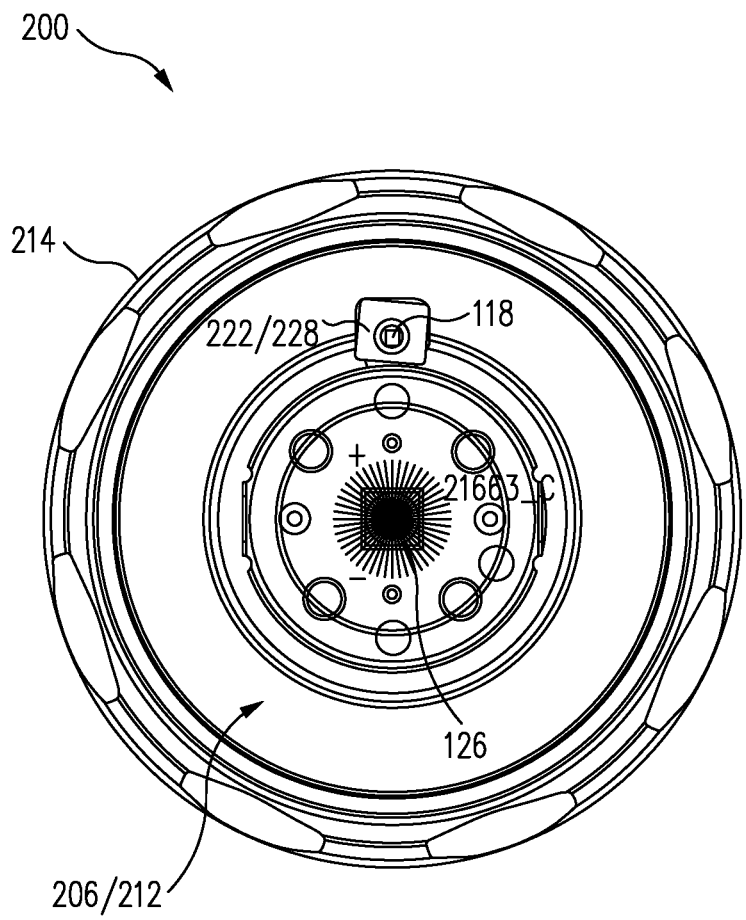
FIG. 2C illustrates a front view of the lighting device of FIG. 2A in accordance with an embodiment of the disclosure.
Figure 2D:
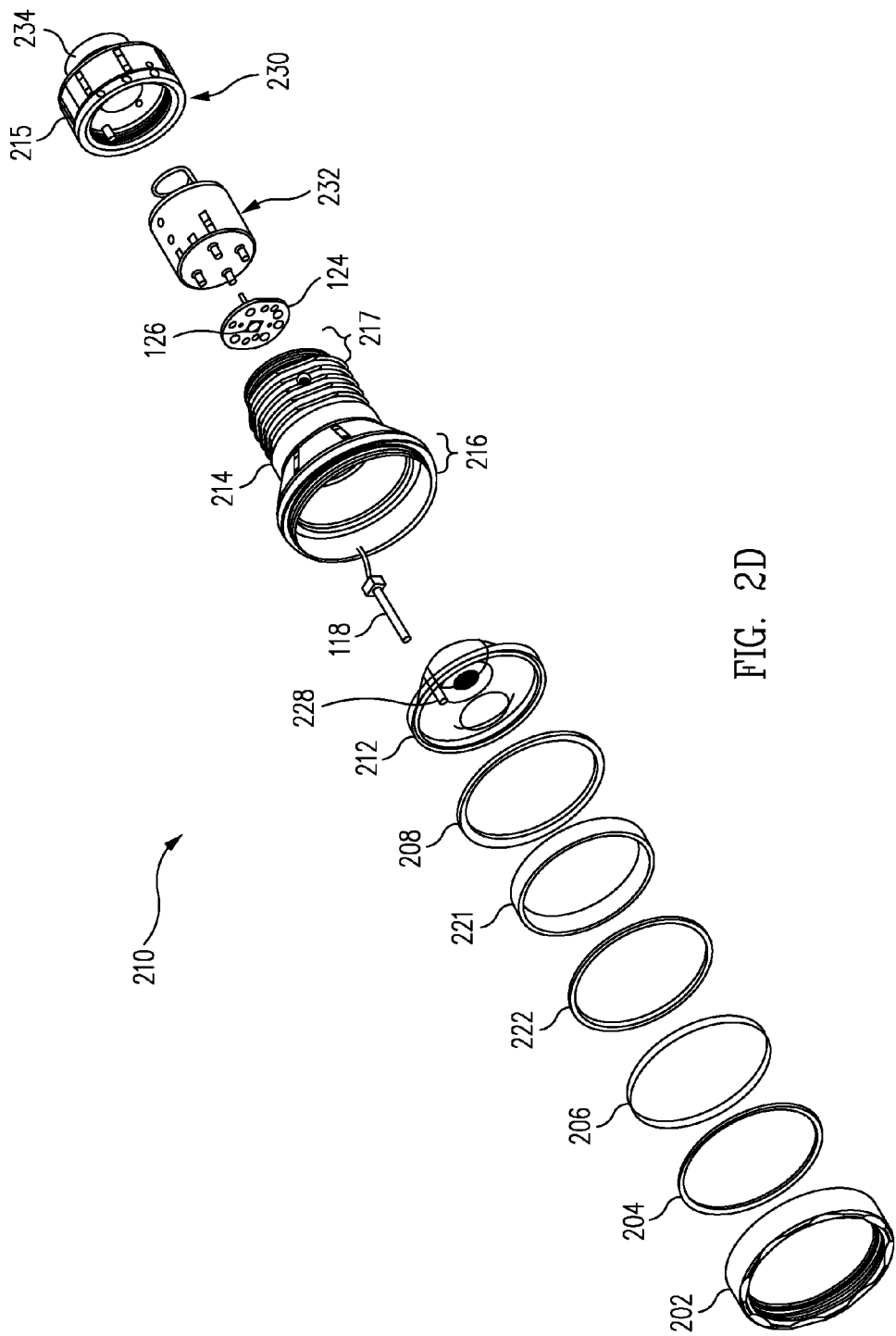
FIG. 2D illustrates an exploded perspective view of the lighting device of FIG. 2A in accordance with an embodiment of the disclosure.

One or more user controls 215 may be provided in the same or similar fashion as user control 115 of lighting device 100. In FIGS. 2A-B and 2D, user control 215 is implemented as a rotary selector ring.

Figure 3:
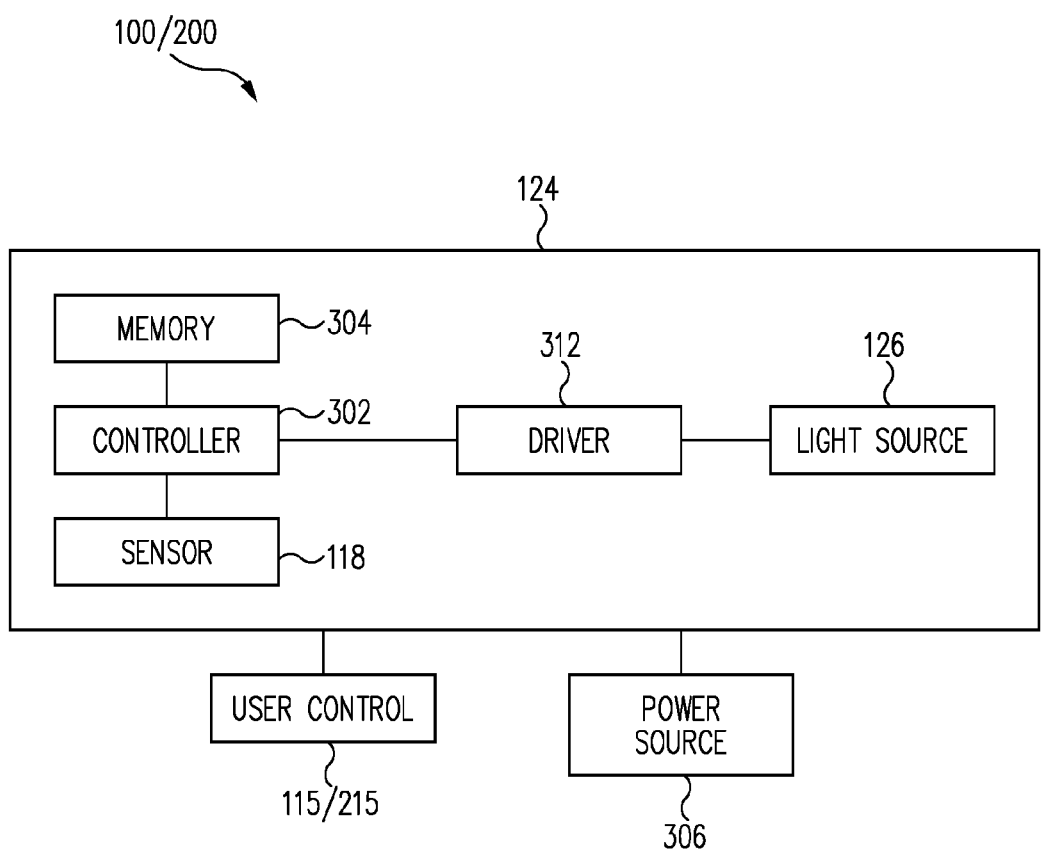
FIG. 3 is a block diagram illustrating various components of a lighting device in accordance with an embodiment of the disclosure.

FIG. 3 is a block diagram illustrating various components of a lighting device in accordance with an embodiment of the disclosure. In this regard, FIG. 3 identifies various electrical components that may be implemented in lighting device 100, lighting device 200, and/or other lighting devices implemented in accordance with the principles discussed herein.

In particular, FIG. 3 identifies various components that may be mounted on and/or otherwise electrically connected to PCB 124. For example, sensor 118, light source 126, controller 302, a memory 304, and a driver circuit 312 may be provided on PCB 124. Power source 306 may be connected to PCB 124 to provide power to one or more of the other illustrated components (e.g., through appropriate connections not shown for purposes of clarity). User control 115/215 may be connected to PCB 124 to provide signals to controller 302 and/or other components. Although several example connections are shown in FIG. 3, various connections may be provided between power source 306, user control 115/215, and/or the other illustrated components which are omitted for purposes of clarity.

As discussed, sensor 118 may detect light and provide signals (e.g., corresponding to illumination measurements) to controller 302 which may adjust the projected light provided by the light source 126 in response thereto. In various embodiments, the operation of controller 302 may be adjusted in response to signals provided by one or more user controls 115/215.

Controller 302 may be implemented, for example, as a microcontroller, microprocessor, a Field Programmable Gate Array (FPGA), an Application Specific Integrated Circuit (ASIC), and/or any appropriate combination of these or other types of devices.

Memory 304 (e.g., implemented as any appropriate type of volatile and/or non-volatile memory) may be used to store instructions and/or data to be used by controller 302. For example, in some embodiments, memory 304 may be implemented as a non-transitory machine-readable medium storing various instructions which may be executed by controller 302 to perform the various operations discussed herein. In some embodiments, such a machine-readable medium may be provided within controller 302 itself (e.g., as firmware and/or otherwise) and/or external to controller 302 and separate from memory 304.

In some embodiments, memory 304 may store data including, for example, illumination measurement data detected by sensor 118 (e.g., hysteresis data corresponding to one or more previously-detected illumination measurements), one or more predetermined settings (e.g., set by a user, a manufacturer, controller 302 itself, and/or otherwise) used by controller 302 to adjust the light projected by light source 126, and/or other data. As such, controller 302 may access and use the data stored by sensor 118 to control the operation of light source 126.

Driver circuit 312 receives signals from controller 302 to adjust the operation of light source 126. For example, driver circuit 312 may provide appropriate voltages and/or currents to light source 126 to selectively turn on, turn off, brighten, and/or dim light source 126 in response to signals received by driver circuit 312 from controller 302. In some embodiments, controller 302 may be connected directly to light source 126 without requiring the use of driver circuit 312. In either case, controller 302 may effectively adjust the operation of light source 126 by providing appropriate signals to driver circuit 312 and/or directly to light source 126.

In response to user manipulation, user control 115/215 provides user signals (e.g., encoded in the form of voltages, currents, and/or data) to controller 302 to select between various modes of operation for lighting device 100/200. In one mode, light source 126 may provide a constant maximum light output. In another mode, light source 126 may provide a constant low light output. In another mode, controller 302 may automatically adjust the light output by light source 126 through a plurality of light levels to maintain a desired overall illumination level (e.g., in some embodiments, the desired overall illumination level may be further selected by user control 115/215 and/or by controller 302). In another mode, light source 126 may be turned off or placed on standby. Other modes are also contemplated.

Figure 4:
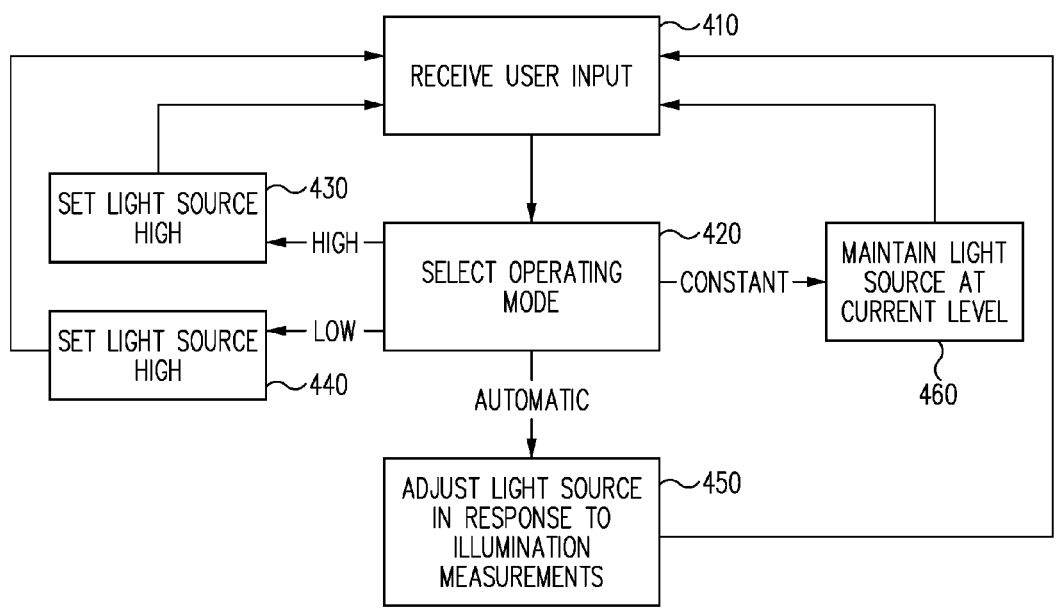
FIG. 4 is a flow chart illustrating a process for selecting an operating mode of a lighting device in accordance with an embodiment of the disclosure.

FIG. 4 is a flow chart illustrating a process for selecting an operating mode of lighting device 100/200 in accordance with an embodiment of the disclosure. In block 410, a user operates one or more user controls 115/215 to provide one or more signals as user inputs to controller 302. Such signals may switch lighting device 100/200 between various modes such as an off mode (e.g., where light source 126 is off), a standby mode (e.g., where light source 126 is off but ready to be turned on), various illumination modes (e.g., where light source 126 provides various levels of projected light), and/or other modes. Such signals may also include, for example, signals to adjust various settings such as an override condition setting discussed herein and/or other settings as appropriate.

In the example illustrated in FIG. 4, the particular user input provided in operation 410 identifies an illumination mode. In this regard, prior to block 410, lighting device 100/200 may already be turned on (e.g., in response to a previously received user input) and operating in a standby mode or an illumination mode (e.g., in response to another previously received user input). In block 420, controller 302 selects an illumination mode in response to the user signal provided in block 420. In the case of a high illumination mode (block 430), controller 302 signals driver circuit 312 to operate light source 126 at a high or maximum brightness. In the case of a low illumination mode (block 440), controller 302 signals driver circuit 312 to operate light source 126 at a low or minimum brightness.

In the case of an automatic illumination mode (block 450), controller 302 signals driver circuit 312 to selectively adjust the brightness of light source 126 in response to illumination measurements provided by sensor 118, as discussed herein with regard to FIGS. 5-8. In the case of a constant illumination mode (block 460), controller 302 signals driver circuit 312 to maintain the present brightness of light source 126. For example, if lighting device 100/200 was previously operating in the automatic illumination mode, switching to the constant illumination mode may disable automatic operation and force light source 126 to remain at the most recent brightness level set during the automatic illumination mode. After an illumination mode is selected (e.g., blocks 430 to 460), the process returns to block 410 where additional user inputs may be received.

Figure 5:
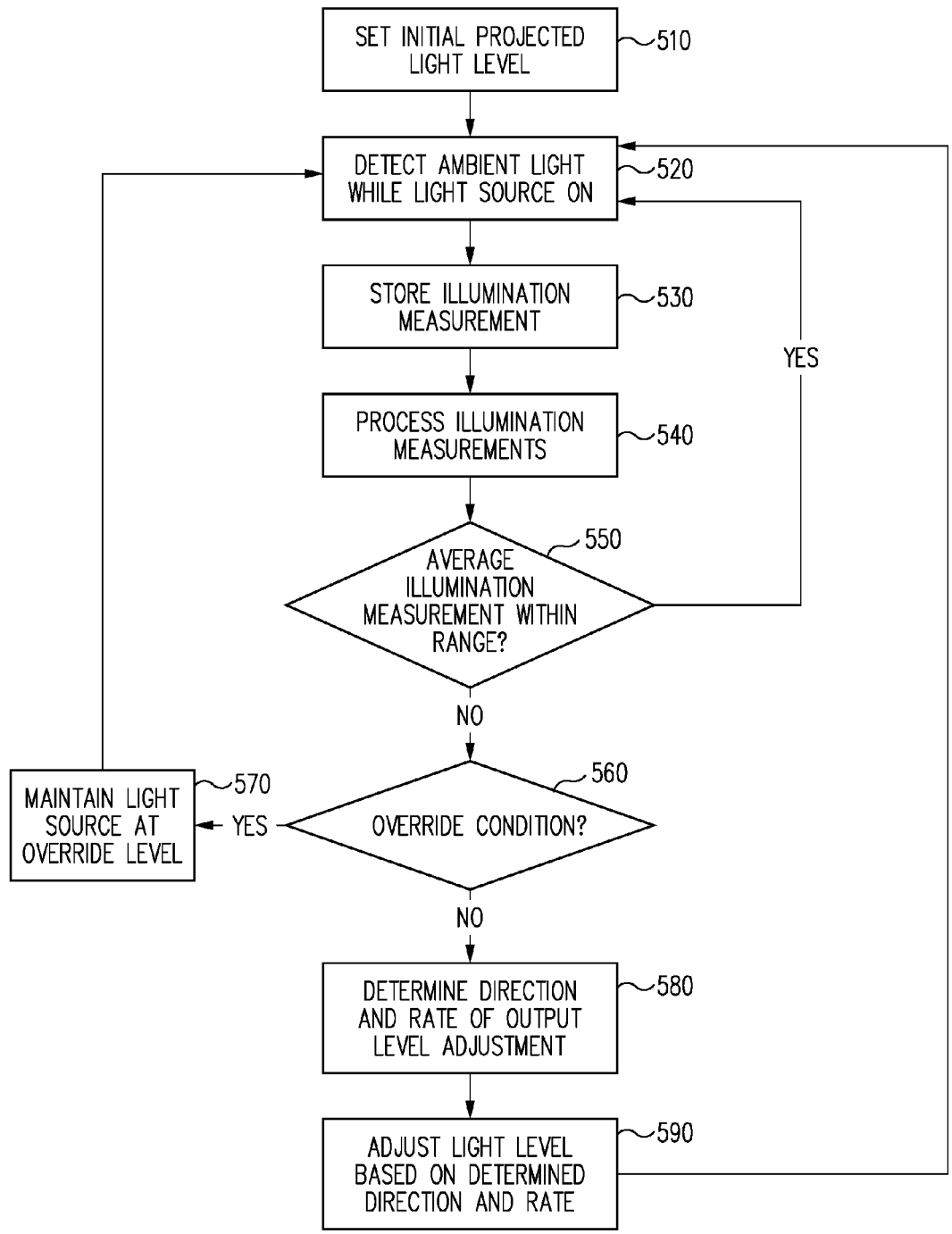
FIG. 5 is a flow chart illustrating a process for adjusting a projected light level of a lighting device in accordance with an embodiment of the disclosure.

FIG. 5 is a flow chart illustrating a process for controlling a projected light level of lighting device 100/200 in accordance with an embodiment of the disclosure. For example, the process of FIG. 5 may be during block 450 of FIG. 4.

In block 510, controller 302 sets the initial projected light level for light source 126. In this regard, controller 302 may set light source 126 to an initial light level based on an initial illumination measurement corresponding to initial ambient light detected by sensor 118 while light source 126 is turned off. As such, light source 126 may be set to different initial light levels for different measured initial ambient light levels. In some embodiments, block 510 may be performed in accordance with the process of FIG. 6 which provides a flow chart illustrating an initialization process for controlling a projected light level of lighting device 100/200 in accordance with an embodiment of the disclosure.

Figure 6:
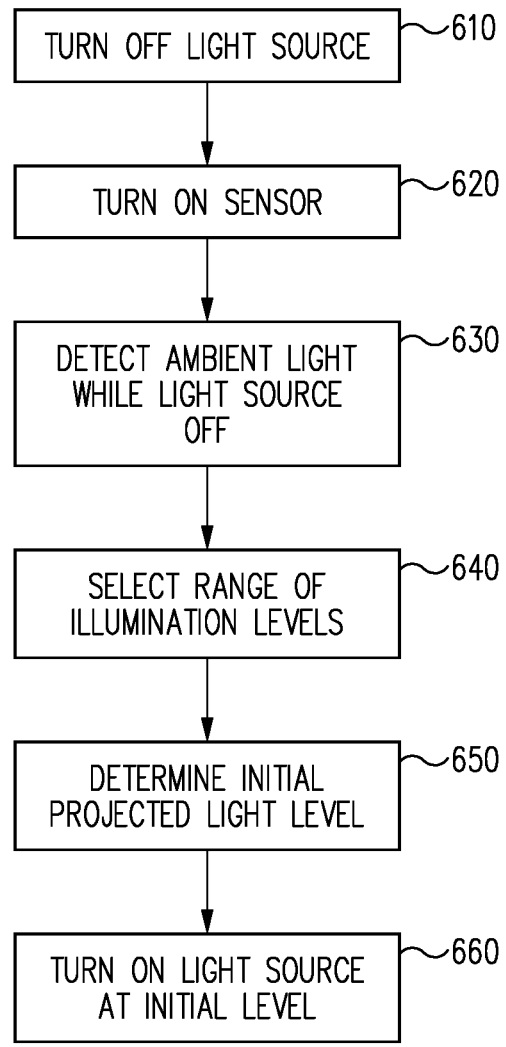
FIG. 6 is a flow chart illustrating an initialization process for controlling a projected light level of a lighting device in accordance with an embodiment of the disclosure.

Referring now to FIG. 6, in block 610, controller 302 may turn off light source 126 (e.g., if already turned on for a previously selected illumination mode). Accordingly, in some embodiments, the user may perceive a temporary switching off of light source 126 (e.g., from block 610 until block 660). In block 620, controller 302 turns on sensor 118 (e.g., if currently off).

In block 630, sensor 118 detects ambient light to provide an initial illumination measurement. In this regard, because light source 126 is turned off, the light detected during block 630 will correspond to ambient light in the operating environment of lighting device 100/200 without any additional light contribution from light source 126. In block 630, one or more initial illumination measurements may be taken. For example, in the case of multiple initial illumination measurements, controller 302 may receive (e.g., sample) the measurements at various time intervals (e.g., every 5 or 10 microseconds, or other intervals), and may use an average value, median value, high value, low value, and/or other value of the measurements as desired.

In block 640, controller 302 selects a range of desired illumination levels for light source 126 based on the one or more initial illumination measurements obtained in block 630. In this regard, in some embodiments, it may be desirable to operate light source 126 such that the total ambient illumination detected by sensor 118 (corresponding to the combination of: (1) the initial ambient light; and (2) any additional projected light from light source 126 reflected back to sensor 118 when light source 126 is on) falls within one or more illumination level ranges.

For example, the following Table 1 identifies several different operating environments and corresponding user conditions, ranges of initial ambient illumination levels, ranges of desired total illumination levels, and initial projected light levels. In various embodiments, the illumination level ranges identified in Table 1 may be stored in memory 304, controller 302, and/or elsewhere (e.g., as a lookup table or as otherwise appropriate). Although three operating environments are identified in Table 1, any greater or lesser number of operating environments (and corresponding user conditions, ranges, and initial light levels) may be provided in various embodiments.

TABLE 1

| Operating environment | User's condition | Initial ambient illumination level detected by sensor at 560 nm wavelength while light source is off | Desired total ambient illumination level to be detected by sensor at 560 nm wavelength while light source is on | Initial projected light level |
|---|---|---|---|---|
| nighttime | eyes adjusted for night vision | 0 $\mu W/m^2$ to 28 $\mu W/m^2$ | 0 $\mu W/m^2$ to 200 $\mu W/m^2$ OR 200 $\mu W/m^2$ (single value) | 5 lumens |
| dark/shadow | eyes slightly adjusted for night vision | 28 $\mu W/m^2$ to 200 $\mu W/m^2$ | 200 $\mu W/m^2$ to 300 $\mu W/m^2$ OR 300 $\mu W/m^2$ (single value) | 15 lumens |
| daylight | eyes not adjusted for night vision | >200 $\mu W/m^2$ | 300 $\mu W/m^2$ to 500 $\mu W/m^2$ OR 500 $\mu W/m^2$ (single value) | 40 lumens |

In some embodiments, the detected initial ambient illumination level may be scaled (e.g., linearly, logarithmically, and/or otherwise) to a corresponding desired total ambient illumination level. For example, in the case of linear scaling in Table 1, an initial ambient illumination level of 28 $\mu W/m^2$ may be scaled to a desired total ambient illumination level of 200 $\mu W/m^2$, while an initial ambient illumination level of 14 $\mu W/m^2$ may be scaled to a desired total ambient illumination level of 100 $\mu W/m^2$. Thus, for a given initial ambient illumination level, a corresponding desired total ambient illumination level may be determined. Although various ranges are identified in Table 1, a desired total ambient illumination level range may include a single value in some embodiments. For example, as also shown in Table 1, a range of initial ambient illumination levels may be associated with a single desired total ambient illumination value in such embodiments. Thus, although ranges of desired total ambient illumination levels are discussed herein, each of such ranges may be implemented by a corresponding single desired total ambient illumination value.

In Table 1, for each operating environment, the difference between the initial ambient illumination level and the corresponding desired total ambient illumination level corresponds to the portion of detected ambient light attributable to light source 126. In some embodiments, the detected ambient light attributable to light source 126 may be a portion of the light projected by light source 126 that is reflected back to and detected by sensor 118 while light source 126 is turned on. For example, in nighttime environments, light source 126 may be operated over a range of projected light levels such that sensor 118 detects a range of 0 $\mu W/m^2$ to 28 $\mu W/m^2$ attributable to the operating environment, and a range of 0 $\mu W/m^2$ to 172 $\mu W/m^2$ attributable to the reflected portion of the light projected by light source 126 (e.g., the sum of ranges 0 $\mu W/m^2$ to 28 $\mu W/m^2$ and 0 $\mu W/m^2$ to 172 $\mu W/m^2$ is 0 $\mu W/m^2$ to 200 $\mu W/m^2$). It will be appreciated that other ranges may be attributable to the reflected light in other operating environments.

In some embodiments, the selected illumination levels may be further determined by a user. In this regard, controller 302 may choose a higher or lower desired illumination range in response to user input (e.g., received in block 410). For example, the user may wish to bias the initial and desired illumination level ranges high if the user desires overall brighter illumination (e.g., for daylight conditions), or bias them low if the user desires overall dimmer illumination (e.g., for nighttime tactical situations using night vision goggles).

The actual output level of light source 126 may be significantly higher or lower than the reflected light detected by sensor 118. For example, in an environment where light source 126 projects light into a generally empty target area, light source 126 may project light at an intensity greater than the illumination level detected by sensor 118 (e.g., very little projected light will be reflected back to sensor 118). As another example, in an environment where light source 126 projects light toward a reflective object or surface (e.g., a wall), light source 126 may project light at an intensity lower than the illumination level detected by sensor 118 (e.g., a large portion of the projected light will be reflected back to sensor 118 while sensor 118 further detects ambient light from other sources).

Thus, by detecting adjusting the light level of light source 126 in response to illumination measurements provided by sensor 118, the overall illumination level may be maintained in one or more desired ranges. For example, if light source 126 shines against a reflective surface in a target area, the projected light level can be adjusted down to reduce the amount of reflected light and thus prevent undesirable glare from dazzling a user's eyes. Similarly, if light source 126 is moved from the reflective surface toward a substantially empty target area, the projected light level can be adjusted up so that the user perceives the target area to be illuminated with the same overall illumination level as previously experienced by the user when shining against the reflective surface.

Thus, in block 640, controller 302 selects a range of desired illumination levels based on the initial ambient illumination level. As shown in Table 1, each selected range may correspond to a particular operating condition (e.g., an environment in which lighting device 100/200 is operated).

In block 650, determines (e.g., selects) an initial (e.g., default) projected light level for light source 126 based on the range of illumination levels selected in block 640. For example, in some embodiments, controller 302 may identify (e.g., in a lookup table, by performing calculations, and/or otherwise) a different initial projected light level for each range. Table 1 above identifies several example initial projected light levels for each range. In some embodiments, the initial projected light level is only a preliminary projected light level, and controller 302 may selectively adjust the projected light level in response to additional illumination measurements in accordance with various processes described herein.

In block 660, controller 302 turns on light source 126 at the initial projected light level identified in block 650. For example, in some embodiments, block 660 may include controller 302 providing appropriate signals to driver 312 and/or directly to light source 126 to set the initial projected light level.

In some embodiments, block 660 may be performed by gradually increasing the brightness of light source 126 until the initial projected light level is reached (e.g., to reduce the likelihood of glare or inadvertently dazzling the user's eyes). In other embodiments, light source 126 may be rapidly turned on at the initial projected light level (e.g., substantially instantaneously without any appreciable gradations perceived by the user).

Referring again to FIG. 5, in block 520, sensor 118 detects ambient light to provide one or more illumination measurements to controller 302. In various embodiments, sensor 118 may provide a single or multiple illumination measurements at various time intervals (e.g., every 5 or 10 microseconds or other intervals). Because light source 126 is now turned on (e.g., as a result of block 660), the ambient light illumination measurements taken in block 520 will include contributions from: the existing ambient light in the operating environment; and possibly a reflected portion of the light projected by light source 126. For example, while light source 126 is on, light projected from light source 126 may reflect off of one or more surfaces in the operating environment and may be received by sensor 118. As a result, the total ambient light received by sensor 118 may include existing ambient light and at least a reflected portion of the projected light.

In block 530, controller 302 stores (e.g., in memory 304 or elsewhere) the illumination measurements taken in block 520. The stored illumination measurements may be used as hysteresis data which identify multiple illumination measurements taken at different intervals and/or during successive iterations of block 520 (e.g., during various repetitions of the processing loops illustrated in FIG. 5).

In block 540, controller 302 selectively processes the stored illumination measurements. For example, in some embodiments, controller 302 may determine an average value of the stored illumination measurements to obtain an average illumination measurement. In this regard, such processing may be performed, for example, on all stored illumination measurements, a sliding window of recent illumination measurements taken over a particular time period or particular number of illumination measurements (e.g., the 30 most recent measurements). Thus, if some of the illumination measurements are abnormally low (e.g., as a result of shadows temporarily covering sensor 118) or abnormally high (e.g., as a result of a temporary reflection, a burst of light, electrical interference, sudden power disruptions, or other anomalies in the operating environment), the effects of these anomalies may be effectively reduced (e.g., smoothed out) in the average illumination measurement (e.g., thus reducing undesirable flickering of light source 126 in response to rapid adjustments based on anomalous illumination measurements). Although an average illumination measurement will be described herein, any appropriate processed illumination measurement (e.g., a median value and/or other processed value obtained in accordance with appropriate techniques) may be used. In some embodiments, a single (e.g., the most recent) illumination measurement is used in place of the average illumination measurement (e.g., processing block 540 may be skipped in some embodiments).

In block 550, controller 302 determines whether the average illumination measurement is within the selected range of illumination levels (e.g., previously determined in block 640). If yes, then this indicates that sum of the detected existing ambient light in the operating environment and any detected reflected portion of the light projected by light source 126 are within desired range of illumination levels. As such, the overall illumination level perceived by a user of lighting device 100/200 will be in an acceptable range appropriate for the operating environment. In this case, the process loops back to block 520 where additional illumination measurements are taken to permit ongoing adjustment of light source 126 if the average illumination measurement subsequently departs from the desired range of illumination levels. Thus, block 520 may be performed iteratively in periodic fashion (e.g., approximately every 5 or 10 microseconds in some embodiments) to repeatedly measure ambient light detected by sensor 118.

Also in block 550, if the average illumination measurement is outside the selected range of illumination levels, then the process continues to block 560 and controller 302 may selectively adjust the projected light level of light source 126 as described herein.

In block 560, controller 302 determines whether an override condition has been set. In some embodiments, a user may selectively enable an override condition that affects the operation of controller 302. For example, a user may operate one or more user controls 115/215 (e.g., in block 410) to provide one or more signals as user inputs to controller 302 to enable or disable the override condition (e.g., stored in memory 304 and/or elsewhere).

If enabled, the override condition may cause controller 302 to refrain from dimming and/or brightening light source 126 under certain conditions. In some embodiments, if one or more illumination measurements are higher (e.g., brighter) than the selected range of illumination levels, then this may indicate that the overall illumination level experienced by the user is currently too bright. However, in some cases, the user may not wish to dim light source 126 despite such measurements. For example, if a user is using lighting device 100/200 to illuminate a target area (e.g., a sidewalk, street, or other target area) at night, the user may desire to continue illuminating the target area using a sustained projected light level, regardless of whether additional ambient light is received by sensor 118 (e.g., from passing cars, streetlights, and/or other sources). Thus, if the override condition is set, then controller 302 may refrain from dimming light source 126 despite the detected additional ambient light. Similarly, an override condition may be used to prevent brightening of light source 126 under appropriate conditions. Thus, the automatic adjustment (e.g., brightening or dimming) of light source 126 may be interrupted in response to the override condition.

In some embodiments, the override condition may be set by controller 302 itself rather than in response to a user input. For example, controller 302 may process one or more illumination measurements (e.g., in block 540) and determine that an anomalous condition exists (e.g., sustained high illumination levels from a passing car, streetlight, and/or other sources; or sustained low illumination levels due to the absence of other light sources, or the absence of reflective surfaces, in the operating environment). In response, controller 302 may selectively set or disable the override condition.

Thus, if an override condition has been set, then controller 302 maintains light source 126 at its current level (e.g., an override level) in block 570, and the process loops back to block 520. Otherwise, the process continues to block 580.

In block 580, controller 302 determines how light source 126 should be adjusted. In this regard, prior to block 580 controller 302 will have determined that the average illumination measurement is higher or lower than the desired illumination range, and will have also determined that no override condition exists. As a result, in block 580, controller 302 determines the direction (e.g., increasing or decreasing brightness) and rate (e.g., slow or fast) at which the projected light should be adjusted. In some embodiments, block 580 may be performed in accordance with the process of FIG. 7 which provides a flow chart illustrating a process for determining a direction and rate of projected light level adjustment of a lighting device in accordance with an embodiment of the disclosure.

Figure 7:
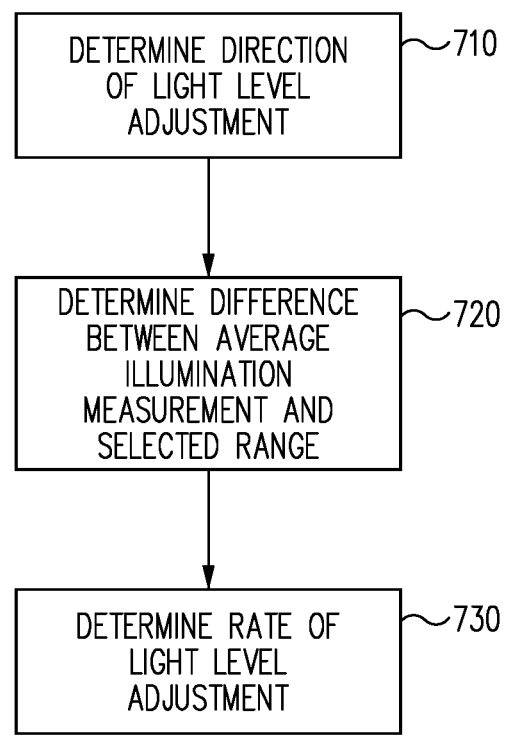
FIG. 7 is a flow chart illustrating a process for determining a direction and rate of projected light level adjustment of a lighting device in accordance with an embodiment of the disclosure.

Referring now to FIG. 7, at block 710, controller 302 determines a direction of the projected light level adjustment. For example, the controller 302 may compare the average illumination measurement with the selected range of illumination levels. If the average illumination measurement is lower than the selected range, then controller 302 may determine that the projected light level should be increased (e.g., a positive increasing direction). If the average illumination measurement is higher than the desired illumination range, then controller 302 may determine that the projected light level should be decreased (e.g., a negative decreasing direction).

At block 720, controller 302 determines a difference between the average illumination measurement and the selected range of illumination levels. For example, the controller 302 may subtract the average illumination measurement from corresponding scaled value (e.g., or single value in the case of a selected range having only a single value) within the selected range, or vice versa, to obtain a difference value.

At block 730, controller 302 determines a rate of projected light level adjustment based on the determined direction (block 710) and the determined difference (block 720). In this regard, controller 302 may increase and decrease the projected light level at different rates. For example, controller 302 may increase the projected light level at a slower rate than when decreasing the projected light level. In this regard, in some embodiments, the projected light level may be increased slowly to prevent a sudden increase in light intensity that may disturb or surprise the user (e.g., a sudden increase in light intensity may temporarily blind or dazzle the user's eyes, since the user's eyes may not have sufficient time to adapt to the brighter light in a nighttime or other dark environment).

In some embodiments, the projected light level may be decreased rapidly (e.g., faster than the rate of increase) to prevent the user from being similarly disturbed or surprised from a bright ambient environment. For example, if a user sweeps lighting device 100/200 across a reflective surface, or multiple lighting devices 100/200 are directed toward the same area, the projected light level may be rapidly decreased to maintain the desired overall illumination level and to prevent the user's eyes from being temporarily blinded or dazzled blinded by a sudden increase in ambient light.

In some embodiments, the rate of projected light level adjustment may be further based on the difference between the current illumination measurements and the selected illumination range. In this regard, the rate of projected light level adjustment may be greater for greater differences between the average illumination measurement and the selected illumination range. As such, when the average illumination measurement is far from the scaled value of the selected illumination range, the controller 302 may adjust the projected light level of the light source 308 relatively quickly. As the average illumination measurement approaches the scaled value of the selected illumination range (e.g., the difference is smaller), the controller 302 may slow down the rate of adjustment to gradually approach the desired illumination range and to prevent controller 302 from overshooting the desired illumination value.

Referring again to FIG. 5, in block 590, controller 302 adjusts the projected light level of light source 126 based on the direction and rate determined in block 580 (e.g., as a result of the process of FIG. 7). In this regard, controller 302 may set light source 126 to provide a new light level that is adjusted in the direction of the selected illumination range. Significantly, controller 302 is not required to instantly select the final desired projected light level in block 590 (e.g., the projected light level does not necessarily jump to its final value). Rather, controller 302 may transition the projected light through one or more projected light levels until the selected illumination range is reached. In various embodiments, such transitions may be performed discretely (e.g., controller 302 may cause light source 126 to step discretely between different levels) or continuously (e.g., controller 302 may cause light source 126 to continuously transition between different levels). In either case, in some embodiments, light source 126 may remain on during the processing loops performed from blocks 520 through 590. In this regard, light source 126 can remain on while being adjusted to various light levels (e.g., ambient light is detected while light source 126 remains on in block 520) and does not require any temporary switching off or other interruption in light 101 (e.g., whether perceptible or imperceptible to the user) during such blocks.

In some embodiments, controller 302 may make a single adjustment in the first iteration of block 590 to transition the projected light level to a new projected level closer to the selected illumination range, but not yet reaching the selected illumination range. The direction of change may depend on the direction determined in block 710. The amount of change (e.g., the step) may depend on the rate determined in block 720 (e.g., larger steps in light level may be used for greater rates of adjustment). In such embodiments, the process then returns to block 520 where another illumination measurement is performed. Thus, blocks 520 through 590 may be performed iteratively to continue adjusting the projected light level through a plurality of projected light levels until the average illumination measurement is within the selected range. Moreover, the adjustment performed in block 590 can be changed in response to new illumination measurements provided in successive iterations of block 520. As a result, the direction and/or rate of adjustment can be repeatedly updated and changed for each iteration of block 590.

In some embodiments, controller 302 may make a plurality of adjustments in each iteration of block 590. In this regard, controller 302 may transition the projected light level through a plurality of projected light levels before the process returns to block 520. For example, controller 302 may transition the projected light level in an appropriate direction and using successive steps (e.g., corresponding to a determined rate of adjustment) in a single iteration of block 590. The process then returns to block 520.

In some embodiments, block 590 may be performed by controller 302 in accordance with a closed loop feedback process, such as a PID process. In some embodiments, block 590 may be performed by an open loop process wherein the light level is selected from one or more lookup tables (e.g., stored in memory 304 or otherwise) based on various input criteria (e.g., current light level, direction of adjustment, rate of adjustment, and/or others).

During the process of FIG. 5, controller 302 may continue to monitor user control 115/215 for additional inputs. In this regard, if a user input is received that selects a different illumination mode during the process of FIG. 5, controller 302 may stop performing the process and instead return to block 420 of FIG. 4 to select a different illumination mode in response to the user input.

Figure 8:
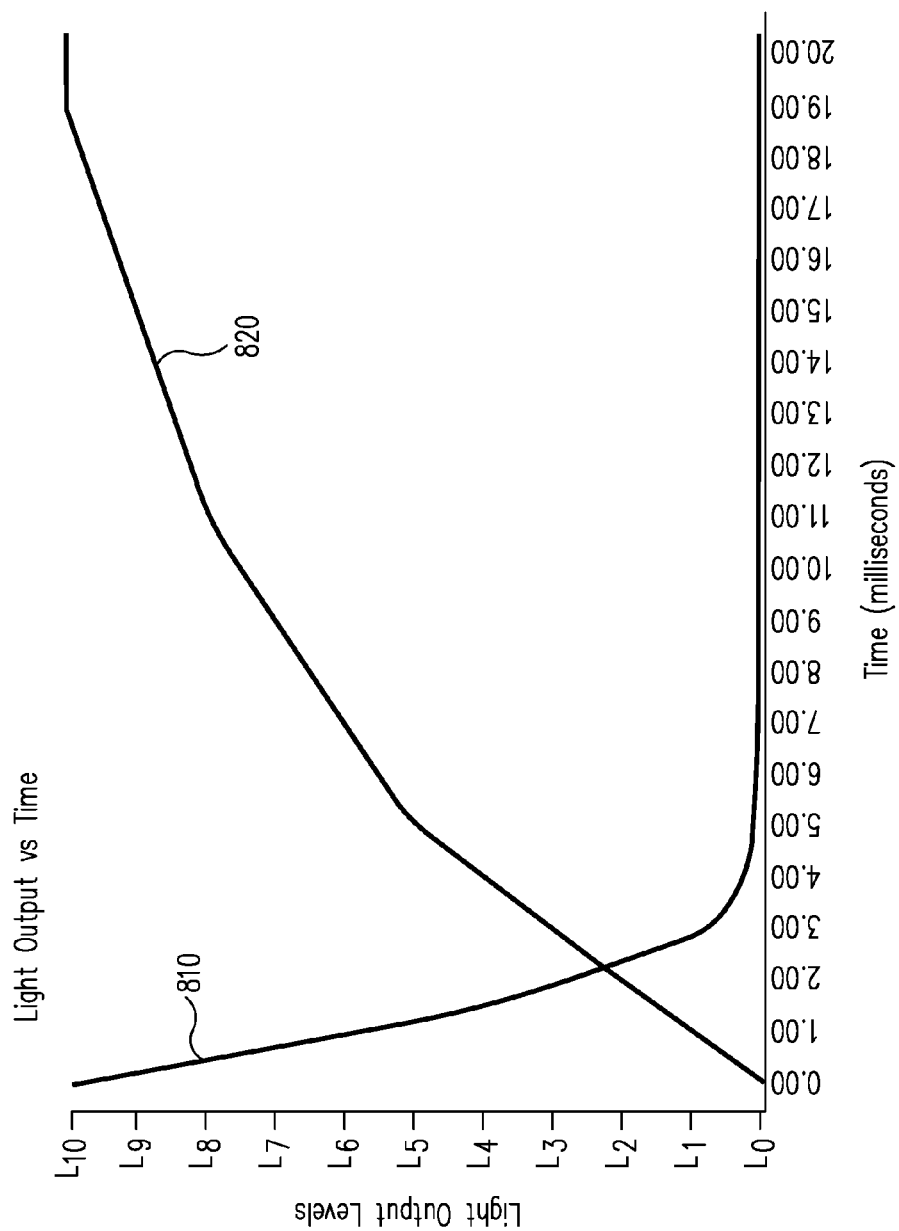
FIG. 8 illustrates projected light levels of a lighting device being adjusted over time in accordance with an embodiment of the disclosure.

FIG. 8 illustrates projected light levels of lighting device 100/200 being adjusted over time in accordance with an embodiment of the disclosure. In particular, FIG. 8 illustrates plots 810 and 820 of the projected light output provided by light source 126 under different conditions over time during the process of FIG. 5. Plot 810 identifies a decreasing light output, and plot 820 identifies an increasing light output. As shown in FIG. 8, the light output dimming demonstrated by plot 810 has an overall faster adjustment rate than the light output brightening demonstrated by plot 820. For ease of reference, the projected light output levels are represented by sample levels L0 to L10 which may correspond, for example, to various illumination levels of light source 126.

Referring first to plot 810, from 0.00 to 20.00 milliseconds, blocks 520 through 590 are iteratively performed to reduce the projected light level from L10 through a plurality of intermediate light levels (e.g., L9 through L1) until light level L0 is reached (e.g., block 510 may have been previously performed to set an initial light level prior to the 0.00 millisecond time).

At 0.00 milliseconds, it may be determined (block 550) that the average illumination measurement is greater than the selected illumination range (e.g., selected in block 640). As a result, controller 302 begins decreasing the light level at 0.00 milliseconds. As shown, from 0.00 to 3.00 milliseconds, plot 810 exhibits a steep slope (e.g., a rapid decrease). This may be caused, for example, by a large difference between the average illumination measurement and the selected illumination range (e.g., a rapid rate of adjustment may have been determined in block 730).

From 3.00 to 4.500 milliseconds, plot 810 exhibits a reduced slope corresponding to a reduced rate of adjustment due to, for example, a smaller difference between the average illumination measurement and the selected illumination range. From 4.500 to 6.00 milliseconds, and again from 6.00 to time 7.00 milliseconds, plot 810 exhibits further reduced slopes as the average illumination measurement approaches the selected illumination range. At time 7.00, the average illumination measurement reaches the selected illumination range (e.g., level L0 in this case). Thus, as shown by plot 810, controller 302 continues to maintain light source 126 at level L0 (e.g., a low level), absent any changes in detected ambient light.

Referring now to plot 820, from 0.00 to 20.00 milliseconds, blocks 520 through 590 are iteratively performed to increase the projected light level from L0 through a plurality of intermediate light levels (e.g., L1 through L9) until light level L10 is reached (e.g., block 510 may have been previously performed to set an initial light level prior to 0.00 milliseconds).

For example, at 0.00 milliseconds, it may be determined (block 550) that the average illumination measurement is less than the selected illumination range (e.g., selected in block 640). As a result, controller 302 begins increasing the light level at time 0.00. As shown, from 0.00 to 4.50 milliseconds, plot 820 exhibits a positive slope that is less drastic (e.g., shallower) than the steep negative slope of plot 810. As discussed, the rate of increase may be slower than the rate of decrease to avoid inadvertently disturbing or surprising the user (e.g., a slow rate of adjustment may have been determined in block 730).

From 4.00 to 10.50 milliseconds, and again from 10.50 to 18.00 milliseconds, plot 820 exhibits even smaller slopes due to, for example, smaller differences between the average illumination measurement and the selected illumination range. At time 18.00, the average illumination measurement reaches the selected illumination range (e.g., level L10 in this case). Thus, as shown by plot 820, controller 302 continues to maintain light source 126 at level L10 (e.g., a high level), absent any changes in detected ambient light.

In various embodiments, the techniques described herein may be used to dynamically adjust the projected light level of light source 126 based on changing ambient conditions. Because the operation of controller 302 depends on the ambient light detected by sensor 118, these techniques may be implemented with a variety of types of light sources or power supplies, and may be used to adapt to various operating environments or situations. For example, when two or more lighting devices 100/200 are used and are pointed at the same area of interest, each lighting device 100/200 may automatically adjust to compensate for detected light projected from the other devices, such that the area of interest is not overly saturated and an overall illumination level may be maintained.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as program code and/or data, can be stored on one or more non-transitory machine-readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

The disclosure is not intended to limit the present invention to the precise forms or particular fields of use disclosed. It is contemplated that various alternate embodiments and/or modifications to the present invention, whether explicitly described or implied herein, are possible in light of the disclosure. For example, it is contemplated that the various embodiments set forth herein may be combined together and/or separated into additional embodiments where appropriate.

Embodiments described above illustrate but do not limit the invention. It should also be understood that numerous modifications and variations are possible in accordance with the principles of the present invention. Accordingly, the scope of the invention is defined only by the following claims.

What is claimed is:
1. A lighting device comprising:
a light source adapted to project light;
a sensor adapted to provide illumination measurements based on ambient light detected by the sensor including at least a reflected portion of the projected light;

a memory adapted to store the illumination measurements as hysteresis data; and a controller adapted to:
select a range of illumination levels,
process the hysteresis data to provide processed illumination measurements,
adjust the projected light based on the processed illumination measurements to transition the projected light through a plurality of projected light levels until at least a first one of the processed illumination measurements is within the range of illumination levels while the projected light exhibits a current projected light level, and
maintain the projected light at the current projected light level until at least a second one of the processed illumination measurements is outside the range of illumination levels.

2. The lighting device of claim 1, wherein:
the sensor is adapted to provide an initial illumination measurement based on initial ambient light detected by the sensor while the light source is not projecting light; and
the controller is adapted to select the range of illumination levels from a plurality of ranges based on the initial illumination measurement.

3. The lighting device of claim 2, wherein the controller is adapted to determine, prior to the light being projected by the light source, an initial projected light level for the light source, wherein a combined level of the initial ambient light and the initial projected light level is within the selected range of illumination levels.

4. The lighting device of claim 1,
wherein the processed illumination measurements comprise averaged hysteresis data.

5. The lighting device of claim 1, wherein the controller is adapted to interrupt adjustment of the projected light in response to an override condition.

6. The lighting device of claim 1, wherein the controller is adapted to:
transition the projected light through decreasing projected light levels at a first rate;
transition the projected light through increasing projected light levels at a second rate; and
wherein the first rate is greater than the second rate to reduce glare perceived by a user of the lighting device.

7. The lighting device of claim 1, wherein the controller is adapted to:
determine a difference between at least one of the processed illumination measurements and at least one of the illumination levels within the range;
transition the projected light through the projected light levels at a rate based on the determined difference; and
wherein the rate is greater for greater determined differences.

8. The lighting device of claim 1, wherein the range of illumination levels corresponds to a single illumination level.

9. The lighting device of claim 1, wherein the controller is adapted to adjust the projected light in accordance with a proportional-integral-derivative (PID) controller process.

10. The lighting device of claim 1, further comprising:
a filter adapted to limit the ambient light and the reflected portion of the projected light detected by the sensor to substantially only visible light; and
wherein the lighting device is a flashlight.

11. A method of operating a lighting device, the method comprising:
selecting a range of illumination levels;
projecting light from a light source of the lighting device;
providing, by a sensor of the lighting device, illumination measurements based on ambient light detected by the sensor including at least a reflected portion of the projected light;
storing the illumination measurements as hysteresis data;
processing the hysteresis data to provide processed illumination measurements;
adjusting the projected light based on the processed illumination measurements to transition the projected light through a plurality of projected light levels until at least a first one of the processed illumination measurements is within the range of illumination levels while the projected light exhibits a current projected light level; and
maintaining the projected light at the current projected light level until at least a second one of the processed illumination measurements is outside the range of illumination levels.

12. The method of claim 11, wherein the selecting comprises:
providing, by the sensor, an initial illumination measurement based on initial ambient light detected by the sensor while the light source is not projecting light; and
selecting the range of illumination levels from a plurality of ranges based on the initial illumination measurement.

13. The method of claim 12, wherein the method further comprises:
determining, prior to the projecting, an initial projected light level for the light source; and
wherein a combined level of the initial ambient light and the initial projected light level is within the selected range of illumination levels.

14. The method of claim 11,
wherein the processed illumination measurements comprise averaged hysteresis data.

15. The method of claim 11, further comprising interrupting the adjusting in response to an override condition.

16. The method of claim 11, wherein:
the projected light transitions through decreasing projected light levels at a first rate;
the projected light transitions through increasing projected light levels at a second rate;
wherein the first rate is greater than the second rate to reduce glare perceived by a user of the lighting device.

17. The method of claim 11, further comprising:
determining a difference between at least one of the processed illumination measurements and at least one of the illumination levels within the range;
wherein the adjusting comprises transitioning the projected light through the projected light levels at a rate based on the determined difference; and
wherein the rate is greater for greater determined differences.

18. The method of claim 11, wherein the range of illumination levels corresponds to a single illumination level.

19. The method of claim 11, wherein the adjusting comprises performing a proportional-integral-derivative (PID) controller process.

20. The method of claim 11, further comprising:
filtering the sensor to detect substantially only visible light; and
wherein the lighting device is a flashlight.

* * * * *